June 5, 1928.

A. E. LINENDOLL 1,672,267

MOTOR CAR HEATER

Filed May 12, 1926

INVENTOR
*Asa E. Linendoll*
BY *Frank D. Gray*
ATTORNEY

Patented June 5, 1928.

1,672,267

UNITED STATES PATENT OFFICE.

ASA E. LINENDOLL, OF NORWALK, OHIO.

MOTOR-CAR HEATER.

Application filed May 12, 1926. Serial No. 108,533.

This invention relates to motor car exhaust heaters, and more especially to heating mechanism including therein radiators in the limousine of the automobile to which pipes lead from the exhaust pipe of an internal combustion engine. It is an object of my improved structure to provide the radiating mechanism within the car with a shield completely enveloping the radiator tubing but spaced therefrom, and further provide spaced means between the shield and radiator for securely holding the latter against independent movement from any cause, thereby preventing effectually undesirable rattling of the parts when in use.

A further object of my improved heater mechanism lies in the provision of radiating means comprising separate entrance and exit tubes spaced for a portion of the distance within the radiator body and then communicating with a common chamber having deflecting devices on the inner surfaces of its walls for tending to direct the gases from one of these tubes throughout the interior of the radiator and thereafter return the same to the other or exit tube.

It is also an additional object of my improvement to mount the heater in fixed relation to some frame part of the car, and to do this by securing means connected to both the said shield and said spacing means, the latter being tightly held between the radiator and shield and a part of the fastening means holding together all three parts—shield, spacer and radiator. The attainment of this object solves very accurately the mounting of the shield and radiator elements detachably upon the car frame and yet permits separation of the parts for purposes of cleaning or repair.

With these and other objects in view, I have embodied my inventive idea in the construction and arrangement of parts later to be described, recited in the appended claims, and illustrated in the accompanying drawings, in which—

The numerals 5 and 6 indicate the inlet and outlet pipes, respectively, which are integral with the radiator body 7 which latter is designed to be mounted upon some frame part of the interior of a car in vertical position, such as fastened to the front part of the rear seat, or even connected to and parallel to the dash of an automobile. The present improvement is not specially concerned with the particular frame connection for the heater, it being only essential that suitable openings be made in the floor (usually) of the car through which the pipes 5 and 6 may be inserted.

Figure 1:
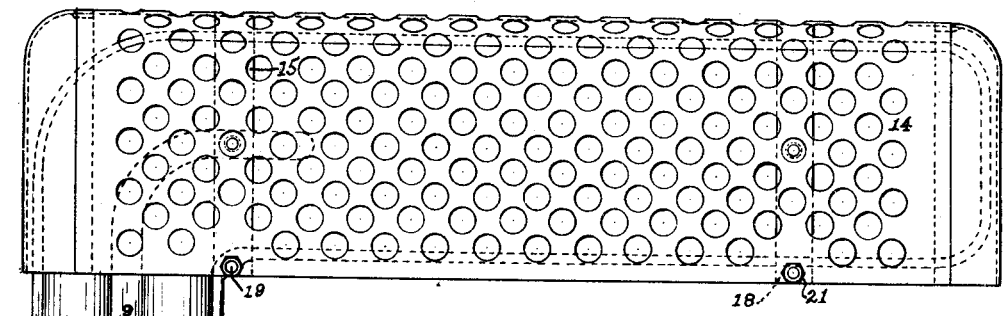
Figure 1 is a side elevation of the heater mechanism shown detached from other parts.
Figure 2:
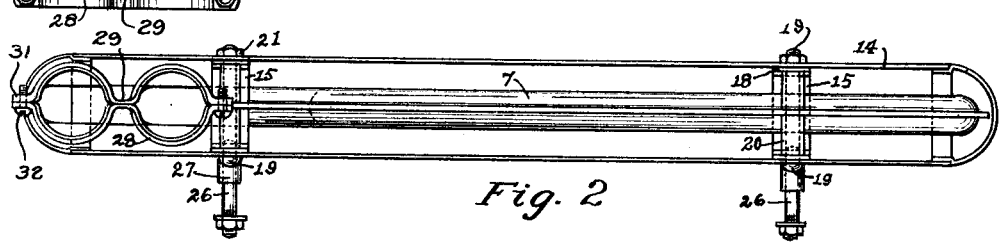
Figure 2 is an inverted plan view of the same.
Figure 3:
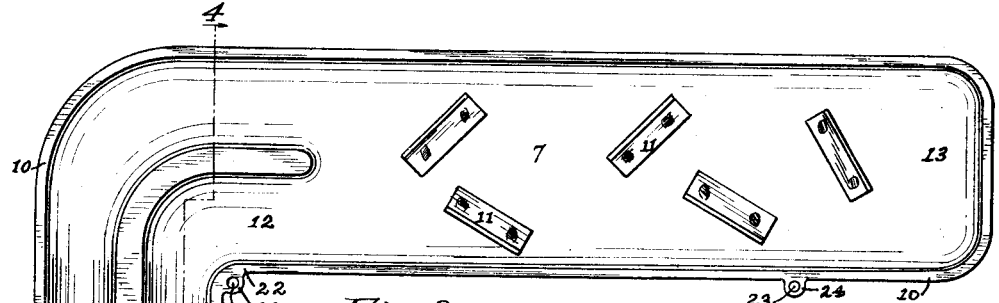
Figure 3 is central, vertical, longitudinal section of the radiator structure.
Figures 4, 5:
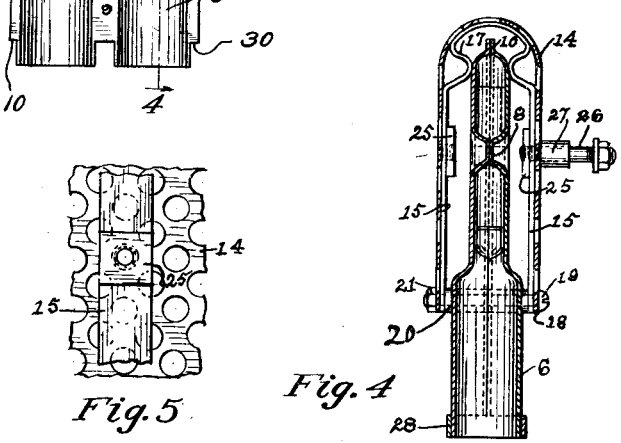
Figure 4 is transverse section of the device taken in the plane indicated by the line 4—4 of Fig. 3.
Figure 5 is a detail view showing the bolt and nut arrangement on the walls of the spacer and shield.

Parts 5, 6 and 7 constitute a unitary structure usually cast or molded in halves of which one is shown in Fig. 3 of the drawings. In this structure a web 8 separates the parts 5 and 6 and projects inward for a short distance into the body 7 where it is at approximately right angles to the entrance end 9. About the body 7 and enclosing the pipes 5 and 6, is a flange 10 provided for each of said halves, and these flanges, as well as the web 8 of each half, are welded together to form a leak-proof heater radiator.

Within the body 7 of the heater I provide baffles 11 which are L-shaped in cross section, one of the arms of each being secured in any suitable manner to the wall of one of the radiator members. They are so positioned at proper angles to the web and relative to each other, that in-coming gases from 5 will be directed with more or less certainty the length of said body and returned to the entrance 12 of the pipe 6. The practical effect of these baffles is to break up currents of gases tending to pass more or less directly to the pipe 6 without reaching the far end 13 of the body. This avoids a dead air space at the end 13.

Over the radiator element I have provided an apertured shield 14 which is designed to be fitted over the radiator as a sort of hood serving to protect garments from direct contact with the radiator element though permitting air currents from the radiator out into the vehicle or other space to be heated. A great difficulty has been experienced in the past in the use of radiator shields, especially when used in moving vehicles, because of the difficulty of holding the shield in positive position upon the radiator, an annoying rattling of parts resulting from the loose arrangement of the shield and radiator. I have overcome these disadvantages by providing inverted-U shaped straps 15 for fitting between the radiator and shield tightly, securing these straps positively to the shield and using the securing bolts or studs 26 to fasten detach-straps positively to the shield and using the part of the interior of the car to be heated.

I form these straps of narrow strips 15 of metal preferably forming loops 17 therein at a point on either side of the radiator as to very suitably contact the radiator there, and also thereby providing a more or less flexible part that will yield somewhat when very unusual strain or pressure is encountered, without necessitating fracture. The lower ends 18 of these straps 15 are apertured to receive therethrough the bolts 19 about which are provided sleeves 20 to properly space the sides of the shield adjacent its lower edges. The nuts 21 are used to tighten the shield edges against the spacing sleeves. There are two of these straps 15 enclosing the radiator, one being located preferably adjacent the angle 22 between the body and pipe arms of the heater. Apertures 23 are also provided through the shield plate and through the flange ears 24 of the radiator for receiving these bolts 19, so that tightening the latter very securely fastens the shield, radiator and intermediate straps together.

Other loops 17 may be provided if desired, though I have only shown those at the upper portions of the radiator. About midway the length of the straps I have provided an aperture (threaded) in each arm and have further strengthened the same by spot welding the nuts 25 to the inner surface of the straps with their apertures registering with the strap apertures and with corresponding apertures in the wall of the shield, so that I may insert studs 26 (preferably double-end studs) through the shield, strap and nut, and thereby very securely anchoring the heater by such studs. About the studs outside the shield I have mounted sleeves 27 for spacing the wall of the shield and strap from the part to which the heater is to be anchored.

At the ends of the pipes 5 and 6, I affix a strap element 28 formed of a pair of straps each comprising spaced semi-circular loops, the straps of the pair being spot welded together, or otherwise secured, at the space portions 29, the two circular loops thus formed being adapted to clamp the respective pipes 5 and 6 just below the lower edges 30 of the flanges 10. The outer ends of these straps have the usual ears 31 with screws 32 for clamping the pipe ends and thereby the gas pipes thereon.

The resulting construction from the above-described disclosure of details is a highly efficient radiator for heating a vehicle from the exhaust pipe of an internal combustion engine (not shown), the same being well enclosed within a shield and securely held in locked position therein, as well as securely fastened detachably to the proper member of the car in which it is used. It is light in weight, easily manufactured and thereby inexpensive, and readily assembled and disassembled. The parts 25 are duplicated on the opposite side of the shield from that in which the studs 26 are shown in the drawings. This enables heater to be attached in opposite positions in the car, and therefore renders it adaptable to the particular arrangement in the car interior. By merely detaching studs 26 from one side of the shield, they can be readily inserted in the corresponding apertures in parts 25, 15 and 14, and thereby connect the entire structure to the back seat of a car, to the back part of the forward seat, or to the dash in front, as may be desired. The openings in the car floor may be made to conform to the position of the pipes 5 and 6.

What I claim and desire to secure by Letters Patent, is—

1. In an exhaust-gas heater, a hollow, L-shaped radiator member one arm of which has a closed end and an interior unobstructed save for the provision of spaced baffles therein, and the end of the other arm comprising spaced entrance and outlet pipes whose spacing web extends through said arm and slightly into the closed arm, the said baffles being suitably inclined to the axis of the closed arm to direct gases entering one pipe, to traverse the length of the closed arm and return to the other pipe.

2. In a heater for motor propelled vehicles, a hollow, radiator member, an enclosing shield detachably fitted over said member from above, inverted-U shaped straps intermediate the member and shield for positioning the member in spaced relation to the walls of the shield, bolts for drawing the outer edges of the shield and the ends of the straps together, there being spacing sleeves on said bolts between the ends of the straps to prevent the latter from approaching each other beyond a fixed limit, and means for securing the straps and shield to a part of a vehicle.

3. In an exhaust-gas heater, a hollow, L-shaped radiator member one arm of which has a closed end and an interior unobstructed save for the provision of spaced baffles therein, and the end of the other arm comprising spaced entrance and outlet pipes whose spacing web extends through said arm and slightly into the closed arm, the said baffles being suitably inclined to the axis of the closed arm to direct gases entering one pipe to traverse the length of the closed arm and return to the other pipe, an enclosing shield detachably fitted over said member from above, and means for securing said shield to a fixed part of the chamber to be heated.

4. In a heater for motor propelled vehicles, an elongated radiator member, a shield enclosing said radiator member and having the form of an inverted-U in cross section, means for detachably securing the shield to the said member, an anchor strap having the form of an inverted-U and having apertured ends, positioned between the shield and member, there being bent loops in said strap for contacting positively either side of the member while other portions of the strap are in contact with the inner surface of the shield, means connected with said strap and shield for securing the heater as a unit to a fixed part of a vehicle.

5. In a heater for motor propelled vehicles, a radiator member comprising an elongated, hollow body portion closed at one end and having entrance and outlet pipes integral with and communicating with the body portion, the side walls of said member being welded together for a portion of its length intermediate their edges to provide a separating web between said pipes, the body portion of the member adjacent said closed end being unobstructed except by the provision of spaced baffles therein to direct gases from one pipe toward the closed end and back to the other pipe, an apertured shield enclosing said member, and means for securing the member and shield to a fixed part of the vehicle.

6. In a heater for motor propelled vehicles, a radiator member comprising an elongated, hollow body portion having entrance and outlet pipes integral therewith, an apertured shield enclosing said member, an anchor strap having the form of an inverted-U and apertured ends, positioned between the shield and member, portions of said strap closely contacting the inner surfaces of the walls of the shield and other portions being in the form of yielding loops contacting either side of the radiator member, and means for securing said strap and shield to a fixed part of the vehicle.

7. In a heater for motor propelled vehicles, a radiator member comprising an elongated, hollow body portion having entrance and outlet pipes integral therewith, an apertured shield enclosing said member, an anchor strap having the form of an inverted-U and having apertured ends positioned between the shield and member, loop portions of said strap contacting either side of said radiator member and other portions contacting the inner surfaces of the walls of said shield, means for positively spacing the ends of the strap and the edges of the shield apart within certain limits and for securing the ends of the strap to the edges of the radiator member, and studs secured to said strap and shield having means for fastening securely the same to a part of the vehicle.

8. In a heater for motor propelled vehicles, a hollow radiator member, an enclosing shield detachably fitted over said member, means for attaching the shield to the member by yielding pressure exerted by the shield against the member, and means for interchangeable attachment to either side of the shield and radiator member for securing the heater as a unit to a fixed part of a vehicle.

9. In a heater for motor propelled vehicles, an elongated radiator member, a shield having the form of an inverted-U in cross section enclosing said member, means intermediate the member and shield for holding the member in spaced relation between the walls of the shield, and studs interchangeably connected to either side of the holding means and shield and provided with means for fastening securely the same to a part of a vehicle.

10. In a heater for motor propelled vehicles, an elongated radiator member, a shield having the form of an inverted-U in cross section enclosing the member, an anchor strap having the form of an inverted-U and having apertured ends positioned between the shield and member, there being threaded apertures at intermediate portions of said strap on opposite sides of the member and corresponding apertures in the walls of the shield, threaded nuts welded to the inner surfaces of the strap in registry with the said apertures in the strap and shield walls, means inserted in the end apertures of the strap for securing the strap and shield to the radiator member, and studs adapted to be secured in said apertures in the intermediate portions of the strap and shield walls and in said nuts, the studs being provided with means for securing the shield, and thereby the strap and radiator member, to a fixed part of a vehicle.

In witness whereof I have hereunto set my hand this 8th day of May, 1926.

ASA E. LINENDOLL.